April 21, 1925.

Re. 16,045

A. R. CLAS ET AL

BRAKE MECHANISM

Original Filed April 15, 1921

Inventor

Angelo Robert Clas

&

Raymond W. Randall

By

Owen, Owen & Crampton.

Attorney

Reissued Apr. 21, 1925. Re. 16,045

UNITED STATES PATENT OFFICE.

ANGELO ROBERT CLAS AND RAYMOND W. RANDALL, OF TOLEDO, OHIO, ASSIGNORS TO THE TOLEDO AUTOMOTIVE PRODUCTS COMPANY, OF TOLEDO, OHIO, A CORPORATION OF OHIO.

BRAKE MECHANISM.

Original No. 1,493,472, dated May 13, 1924, Serial No. 461,627, filed April 15, 1921. Application for reissue filed July 5, 1924. Serial No. 724,495.

*To all whom it may concern:*

Be it known that we, ANGELO ROBERT CLAS and RAYMOND W. RANDALL, citizens of the United States, and residents of Toledo, county of Lucas, and State of Ohio, have made an invention appertaining to Brake Mechanism; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to brake mechanism customarily used on automobiles and particularly to the lining construction thereof.

In brake constructions of this character it is customary to rivet the fiber lining strip to the brake band so that considerable labor is involved in replacing a worn out lining and in removing the band from around the brake drum to permit such replacement and then replacing the band.

The object of this invention is the provision of a brake mechanism the lining member of which may be easily and quickly removed therefrom with a minimum of labor and without necessitating removal of the brake mechanism.

The invention is fully described in the following specification, and while in its broader aspect it is capable of embodiment in numerous forms, a preferred embodiment thereof is illustrated in the accompanying drawings, in which,—

Figure 2:
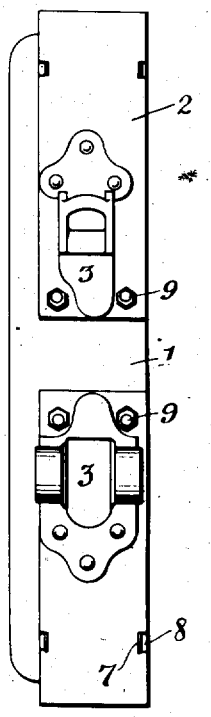
Figure 1:
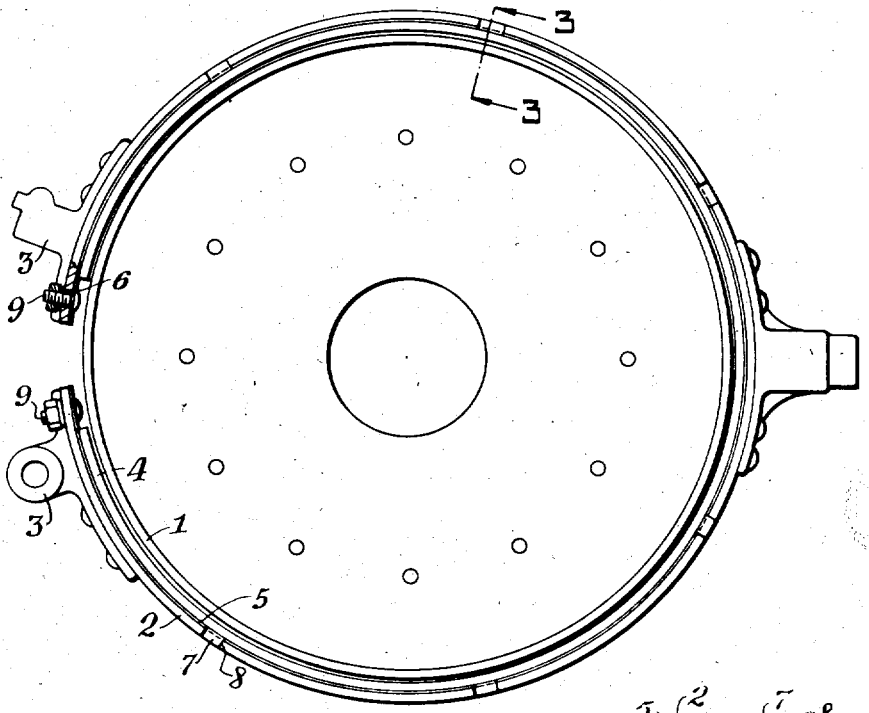
Figure 3:
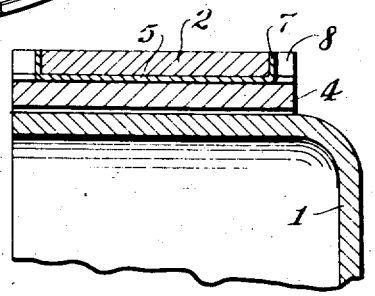
Figure 4:
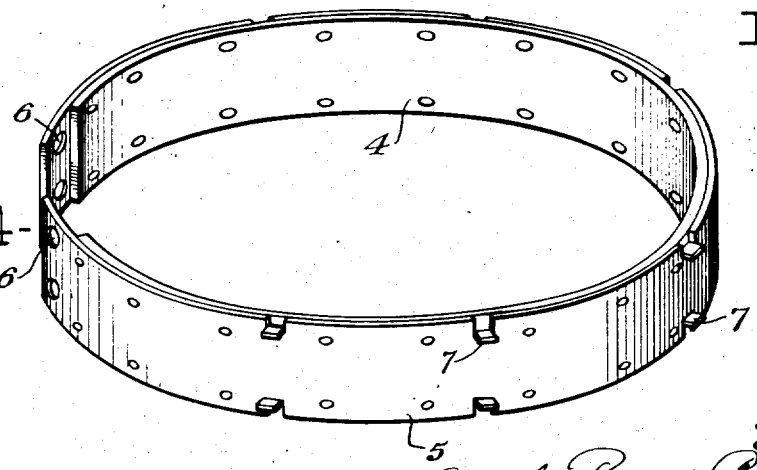
Figure 5:
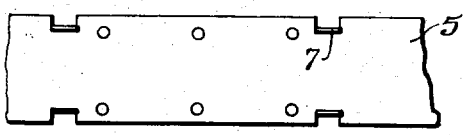

Fig. 1 is a side elevation of a brake embodying the invention with a part broken away. Fig. 2 is an edge elevation thereof. Fig. 3 is an enlarged fragmentary cross-section on the lines 3—3 in Fig. 1. Fig. 4 is a perspective view of a brake lining and its carrying strip embodying the invention, and Fig. 5 is a fragmentary side view thereof.

Referring to the drawings, 1 designates a brake drum such as used in connection with automobile brakes, and 2 is a split brake band encircling the drum and mounted and connected to the operating means in the customary or any suitable manner, as well understood in the art. Riveted or otherwise suitably fixed to the ends of the band are the customary castings or bracket members 3 to which the operating mechanism is attached.

A band lining strip 4 of fiber or other suitable matter is riveted or otherwise suitably secured to an external carrying strip 5, preferably of thin sheet metal, of the same width as the lining, and extending at its ends slightly beyond the lining ends. Slots 6 extending lengthwise of the strip 5 are provided in the extended ends thereof and the edges of the strip are provided at intervals with outwardly projecting spurs or ears 7 for entering complemental notches 8 in the band edges to prevent relative circular creeping movements of the strip 5 and brake band 2. The spurs or ears 7 are preferably formed by striking the same outward from the strip edges.

The lining 4 and its carrying strip 5, when mounted in the brake band, is held in position therein by the interengaging of the spurs 7 and notches 8 and by bolts 9, or other suitable releasable members, which pass through apertures in the ends of the brake band members 3 and the registering slots 6 in the end extensions of the strip 5.

It is evident that lining strips 4 with carrying strips 5 attached thereto may be carried in stock ready for application to a brake and that the replacement of a worn brake lining may be easily and quickly accomplished by loosening the brake band sufficiently relative to the drum 1 to permit an inward movement of the lining and carrying strip to withdraw the spurs 7 from the band notches 8 after which the lining and carrying strip may be removed laterally from between the band and drum, the bolts 9 being first removed to permit a separation of the band 2 and strip 5. A new lining and carrying strip may then be placed between the drum and band and secured in expanded relation to the band by the bolts 9, with its spurs 7 projecting into the band notches 8. This replacement operation effects a material saving of time and labor over that required for replacing a brake band of the ordinary construction, as it is neither necessary to remove the brake band from around the drum nor to knock out the rivets connecting the worn out lining and band and then rivet a new lining to the band, after which the band is mounted around the brake drum.

It will be understood that our invention is not limited to any specific construction, arrangement or form of the parts, as it is capable of embodiment in numerous forms without departing from the spirit of the claims.

Having thus described our invention, what we claim as new and desired to secure by Letters Patent, is,

1. In a brake of the class described, a brake member, a lining unit for the member comprising a split pliant strip for fitting the member and a fibrous lining fixed thereto, and means releasably clamping the ends of the pliant strip to the ends of the member, one of said member and strip having notches therein and the other having spurs for loosely projecting into the notches and adapted to permit a disengagement of the member and lining unit by movement of the unit relative to the member.

2. In a brake of the class described, a split brake band having a plurality of notches in longitudinal spaced relation along its side edges, brackets fixed to the ends of the brake band and overhanging the same, a lining unit for the band comprising a split pliant metallic strip for fitting into the band and a fibrous lining fixed to the inner side of the band, the pliant strip having edge spurs projecting therefrom into the band notches, and means releasably and adjustably clamping the ends of the pliant strip to the respective band brackets.

3. In a brake of the class described, a split brake, a lining unit for the band comprising a split pliant strip for fitting into the member and a fibrous lining fixed to the strip and terminating short of its ends, the projecting ends of the strip being longitudinally slotted, and bolts projecting through the slots in the respective ends of the lining strip to adjustably connect the strip and member, one of said member and strip having notches therein along its side edges and the other having spurs for loosely projecting into the notches and adapted to permit disengagement of the member and lining unit by movement of the unit relative to the member.

4. In a brake mechanism, the combination with a brake drum of a coacting brake unit, comprising a pliant metallic strip, a fibrous liner for said strip and secured thereto, and a carrying means for said strip at the opposite side thereof to said liner, said strip and means being connected together at the ends of the strip, one of said strip and means having spurs projecting therefrom and the other having openings with which the spurs have releasable engagement, said means being operable to move the strip and liner to place the latter in braking engagement with the drum.

5. In a brake mechanism, the combination with a drum of a coacting brake unit comprising a pliant strip having spurs projecting from its edges intermediate its ends, a fibrous liner fixedly carried by the strip at one side thereof for engagement with the drum, and a carrying means for the strip operable to move the liner into and out of braking engagement with the drum, said means having openings therein into which said spurs releasably project, and means connecting the ends of the strip to the first means.

In testimony whereof we have hereunto signed our names to this specification.

ANGELO ROBERT CLAS.
RAYMOND W. RANDALL.